United States Patent [19]

Kaiya et al.

[11] Patent Number: 4,660,052

[45] Date of Patent: Apr. 21, 1987

[54] HEAT-SENSITIVE RECORDING APPARATUS

[76] Inventors: Mitsuhiro Kaiya; Masaki Denda; Masashi Shimada; Hideki Ohnuki; Mineo Ogura, all of 31-1, Kameido 6-chome, Koto-ku, all of Tokyo, Japan

[21] Appl. No.: 871,719

[22] Filed: Jun. 6, 1986

[51] Int. Cl.[4] .......... G01D 15/10; B41J 3/20

[52] U.S. Cl. .......... 346/76 PH; 400/120

[58] Field of Search .......... 346/76 PH; 400/120

[56] References Cited

U.S. PATENT DOCUMENTS

| | | | |
|---|---|---|---|
| 3,453,649 | 7/1969 | Hurst et al. | 346/76 PH |
| 3,792,481 | 2/1974 | Nagashima et al. | 346/1.1 X |

*Primary Examiner*—E. A. Goldberg
*Assistant Examiner*—Gerold E. Preston
*Attorney, Agent, or Firm*—Bruce L. Adams; Robert E. Burns; Emmanuel J. Lobato

[57] ABSTRACT

Thermal printing is conducted as follows generally-used small-width thermal heads having an effective width equal to the width of A-4 size paper or B-4 size paper are arranged in rows, each of which has a plurality of thermal heads, over two parallel platens extending at right angles to the direction in which the recording paper is moved, in such a manner that the thermal heads in different rows are alternately in the direction of the width of the recording paper, whereby the heating resistors in the thermal heads in different rows overlap one another with respect to the direction in which the recording paper is moved.

2 Claims, 3 Drawing Figures

HEAT-SENSITIVE RECORDING APPARATUS

BACKGROUND OF THE INVENTION 1. (Field of Utilization of the Invention)

This invention relates to a heat-sensitive recording apparatus provided with thermal heads, and more particularly to a large-sized heat-sensitive recording apparatus having an effective width equal to and larger than the width of A-1 size paper.

2. (Prior Art)

A thermal head of a heat-sensitive recording apparatus is used for a printer and a facsimile, and now widespread among the general public. Since this heat-sensitive recording apparatus uses a small-width thermal head having an effective width equal to the width of A-4 size paper or B-4 size paper, the recording of an original of such a width that is other than the width of A-4 and B-4 size paper cannot be done.

3. (Problems to be Solved by the Invention)

It is desired that a heat-sensitive recording system which has a simple construction, and which enables high-speed printing, be applied to a large-sized recording apparatus, such as a plotter which is used as a terminal output unit for a CAD/CAM. Among the thermal heads used for heat-sensitive recording apparatuses, thermal heads of small effective widths equal to the widths of A-4 and B-4 size paper have already been commercialized but it is technically difficult to manufacture thermal heads of large effective widths equal to the widths of A-1 and A-0 size paper. Therefore, thermal heads of such large effective widths have not yet been manufactured, nor have large-sized heat-sensitive recording apparatuses for A-1 and A-0 size recording paper been commercialized.

4. (Means for Solving the Problems)

In order to solve these problems, the present invention is constructed as follows. The generally-used small-width thermal heads having an effective width equal to the width of A-4 size paper or B-4 size paper are arranged in rows, each of which has a plurality of thermal heads, over two parallel platens extending at right angles to the direction in which the recording paper is moved, in such a manner that the thermal heads in different rows are alternately disposed in the direction of the width of the recording paper, whereby the heating resistors in the thermal heads in different rows overlap one another with respect to the direction in which the recording paper is moved.

5. (Function)

Parts of a one-dot line extending in the direction of the width of the recording paper are printed by the thermal heads provided on the upstream side of the moving recording paper. When the printed parts of the one-dot line have reached the positions of the heating resistors in the thermal heads on the downstream side of this recording paper, the remaining parts of the one-dot line are printed by the downstream thermal heads. Thus, the parts of the one dot line which have been printed by the upstream thermal heads and the parts thereof which have been printed by the downstream thermal heads are joined to one another. Consequently, one dot line the length of which is larger than that of a thermal head disposed so as to extend in the direction of the width of the recording paper is obtained.

Accordingly, if the number of the thermal heads provided in a thermal recording apparatus is suitably set, the printing of letters of a width equal to or larger than that of A-1 size paper or A-0 size paper can be easily realized.

SUMMARY OF THE INVENTION

This invention is directed to a thermal head for a heat-sensitive recording apparatus, in which generally-used small-width thermal heads having an effective width equal to the width of A-4 size paper or B-4 size paper are arranged in rows, each of which has a plurality of thermal heads, over two parallel platens extending at right angles to the direction in which the recording paper is moved, in such a manner that the thermal heads in different rows are alternately arranged in the direction of the width of the recording paper. Since the heating resistors in the thermal heads overlap each other in the direction in which the recording paper is moved, an image can be transferred by these thermal heads to the recording paper without being broken in the direction of the width thereof. This enables high-speed printing of images on large-width recording paper including the A-1 and A-0 size recording paper, which was heretofore difficult to be carried out, to thus be done excellently.

DETAILED DESCRIPTION OF PREFERRED EMBODIMENTS

An embodiment of the present invention will now be described.

Figure 1:
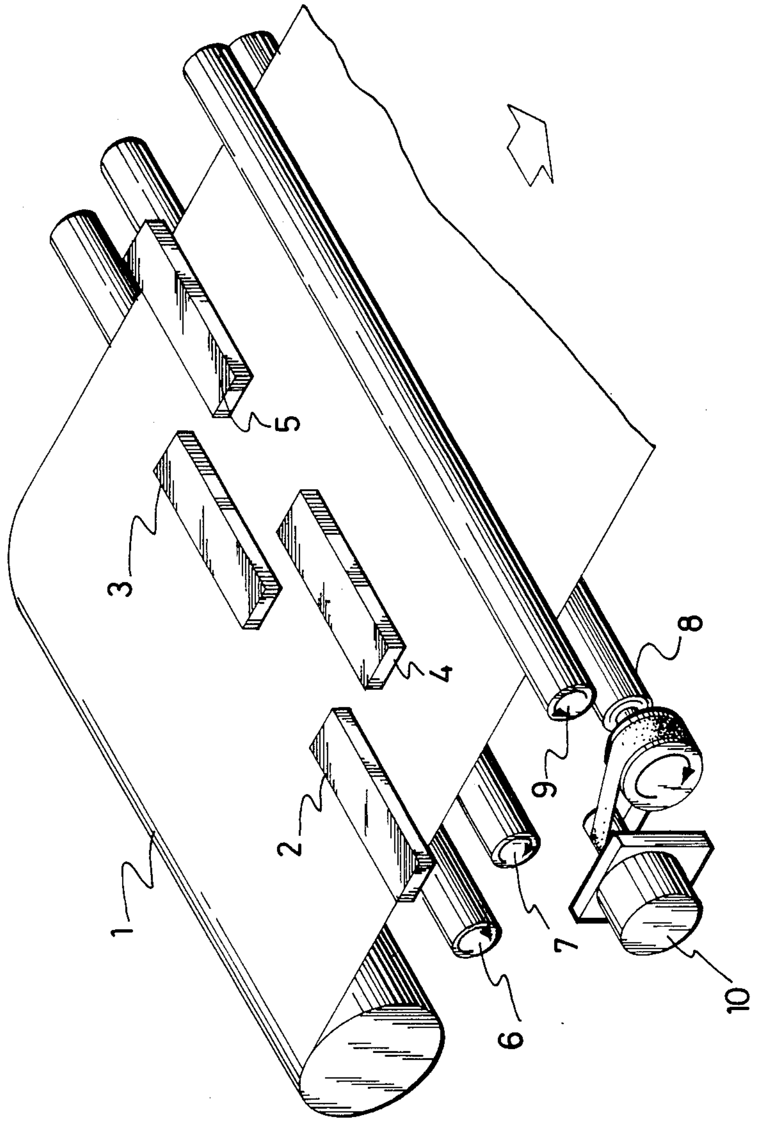
FIG. 1 is a construction diagram of an embodiment of the apparatus according to the present invention.

FIG. 1 is a construction diagram of an embodiment of the apparatus according to the present invention.

Figure 2:
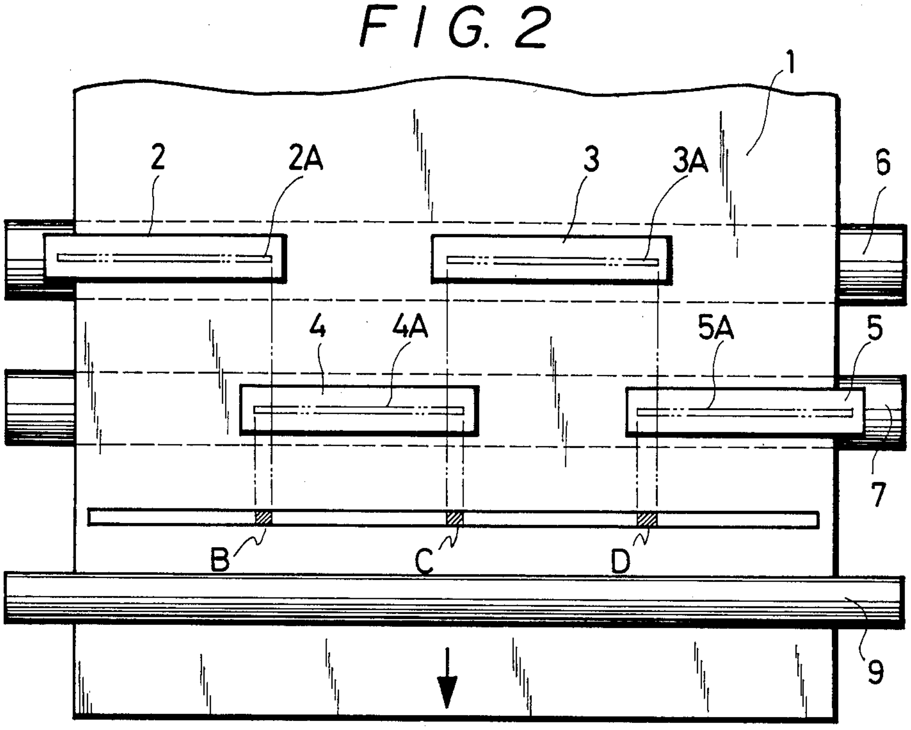
FIG. 2 is a plan view showing the arrangement of thermal heads in the embodiment.
Figure 3:
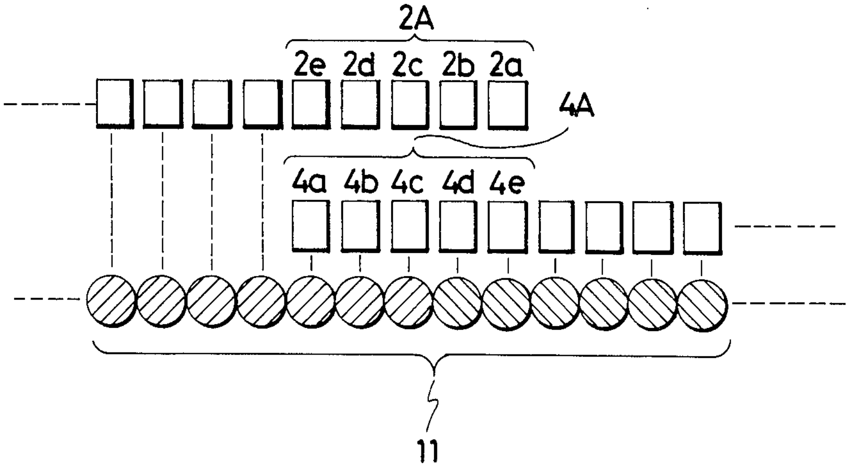
FIG. 3 is an enlarged view showing the overlapping positional relation between the heating resistors in the thermal heads in the embodiment.

FIG. 2 is a plan view showing the arrangement of the thermal heads provided in the embodiment, and FIG. 3 an enlarged view showing the overlapping positional relation between a heating resistor in an upstream thermal head and that in a downstream thermal head.

Referring to FIG. 1, reference numeral 1 denotes heat-sensitive paper, 2, 3, 4 and 5 thermal heads, 6 and 7 platen rollers against the cylindrical side surfaces of which the heat-sensitive paper 1 and thermal heads 2, 3, 4, 5 are pressed, 8 a feed roller adapted to transfer the heat-sensitive paper forward, 9 a pinch roller closely contacting the paper feed roller 8 so as to generate the paper transfer force, and 10 a stepping motor for driving the paper feed roller 8.

The platen rollers 6, 7 and paper feed roller 9 are arranged in parallel with one another in the direction in which the recording paper is moved, and these rollers 6, 7, 9 as well as the stepping motor 10 are supported on a side plate (not shown in the drawing). The thermal heads 2, 3 are positioned over the axis of a cylindrical body of the platen roller 6, and the thermal heads 4, 5 over the axis of a cylindrical body of the platen roller 7, in such a manner that the thermal heads 2, 3; 4, 5 are aligned with each other. The thermal heads 4, 5, 6, 7 are pressed against the platen rollers 6, 7 by a thermal head pressing means (not shown in the drawing), and the pinch roller 9 against the paper feed roller 8 by a roller pressing means (not shown in the drawing).

The paper feed roller 8 and pinch roller 9 are rotated by the driving force of the stepping motor 10, so that the heat-sensitive paper 1 is transferred in the direction of an arrow.

Referring to FIG. 2, reference numeral 2A denotes a heating resistor in the thermal head 2, and 3A, 4A and 5A heating resistors in the thermal heads 3, 4, 5 respectively. The heating resistors 2A, 3A are provided linearly over the axis of the cylindrical body of the platen roller 6, and the heating resistors 4A, 5A over the axis of the cylindrical body of the platen roller 7. The heating resistors 2A, 4A; 3A, 4A; 3A, 5A are alternately disposed in the direction of the width of the recording paper and overlap each other in the direction in which the recording paper is moved, and their overlapping portions are designated by reference letters B, C, D. Owing to this arrangement, the letters in a one dot line are printed by these thermal heads with no parts of the dot line left unprinted.

Referring to FIG. 3, the printing operation of the overlapping portions of the thermal heads, which have been described with reference to FIG. 2, will now be described in detail. Reference numerals *2a, 2b, 2c, 2d, 2e*, . . . denote the dots of the heating resistor in the overlapping portion B, *4a, 4b, 4c, 4d, 4e*, . . . the dots of the heating resistor 4A in the same overlapping portion B, and 11 a one-dot line printed by these dots. A part of the one-dot line is printed in the direction of the width of the recording paper over the axis of the cylindrical body of the platen roller 6 by the thermal head 2, and thereafter the heat-sensitive paper 1 is transferred in the direction of the arrow. When the part, which has been printed by the thermal head 2, of the one-dot line has reached a position over the axis of the cylindrical body of the platen roller 7, the remaining part of the one-dot line is printed by the thermal head 4. During this time, the arrival of the part, which has been printed by the thermal head 2, of the one-dot line at the position over the axis of the cylindrical body of the platen roller 7 is detected by counting a step number, which is obtained by converting a distance between the axes of the two platen rollers 6, 7 into the number of steps of the stepping motor, from a point of time which is immediately after the completion of the printing operation of the thermal head 2. Accordingly, if the accuracy of the distance between the axes of the platen rollers 6, 7 is kept high, a high part-joining accuracy of a one-dot line can be easily obtained since the heating resistors 2A, 4A in the thermal heads 2, 4 are positioned over the axes of the cylindrical bodies of the platen rollers 6, 7.

While the parts, which have been printed by the thermal heads 2, 4, of the one-dot line, are joined to each other, the dots up to the dot *2c* are printed by the heat resistor 2A in the thermal head 2, and the remaining part, which starts with the dot *4d*, of the one-dot line by the heating resistor 4A in the thermal head 4. Consequently, the parts of one-dot line are joined to each other on the recording paper, so that a one-dot line 11 is formed.

When four thermal heads 2, 3, 4, 5 are arranged alternately over the axes of the cylindrical bodies of the platen rollers 6, 7 as shown in FIG. 1, the heating resistors 2A, 3A in the thermal heads 2, 3 and the heating resistors 4A, 5A in the thermal heads 4, 5 are aligned with each other over the axes of the cylindrical bodies of the platen rollers 6, 7, respectively. Therefore, if the printing operations similar to the previously-mentioned printing operation are carried out by the thermal heads 2,3,4,5 the letters printed by these thermal heads are joined to each other on the recording paper. This enables the lines of letters of a large width equal to a total length of the four thermal heads 2, 3, 4, 5 to be printed. Moreover, the space in which the thermal heads are to be arranged may have only a width equal to a total width of two thermal heads. The same applies, of course, to the case where not less than four thermal heads are employed.

(Effect of the Invention)

According to the present invention described above, generally-used small-width thermal heads having an effective width equal to the width of A-4 size paper or B-4 size paper are arranged in rows, each of which has a plurality of thermal heads aligned with each other in the direction of the width of the recording paper, over parallel platen rollers so that the heating resistors in different rows overlap one another in the direction in which the recording paper is moved, whereby the printed lines of letters which have a large width equal to the widths of A-1 size paper or A-0 size paper can be obtained.

Two platen rollers are arranged in parallel with each other in the direction in which the recording paper is moved, and thermal heads are positioned alternately over these two platen rollers. Therefore, if only the accuracy of the distance between the axes of the platen rollers is kept high, a high accuracy of the distance between the heating resistors in the thermal heads can be obtained, and the accuracy of joining the printed letters can be increased to a high level easily. Since the thermal heads are arranged alternately, the space for installing the thermal heads may have only such a width that is as large as a total length of two thermal heads even when not less than four thermal heads are employed. This enables the apparatus to be made compact.

The present invention can, of course, be applied effectively to not only a heat-sensitive recording system but also a heat-sensitive transfer-recording apparatus using linear thermal heads.

What is claimed is:

1. A heat-sensitive recording apparatus having a linear thermal head, characterized in that a plurality of said thermal heads are arranged in a plurality of rows, each of which has a plurality of said thermal heads extending over a platen roller and in the direction of the width of recording paper, in such a manner that heating resistors in said thermal heads in adjacent rows overlap one another with respect to the direction in which said recording paper is moved.

2. A heat-sensitive recording apparatus according to claim 1, wherein two platen rollers are disposed in parallel so that they extend at right angles to the direction in which said recording paper is moved, said thermal heads being arranged alternately over said platen rollers.

* * * * *